E. KARDOS.
APPARATUS FOR SEPARATING MATERIALS.
APPLICATION FILED DEC. 22, 1915.
1,250,590.
Patented Dec. 18, 1917.
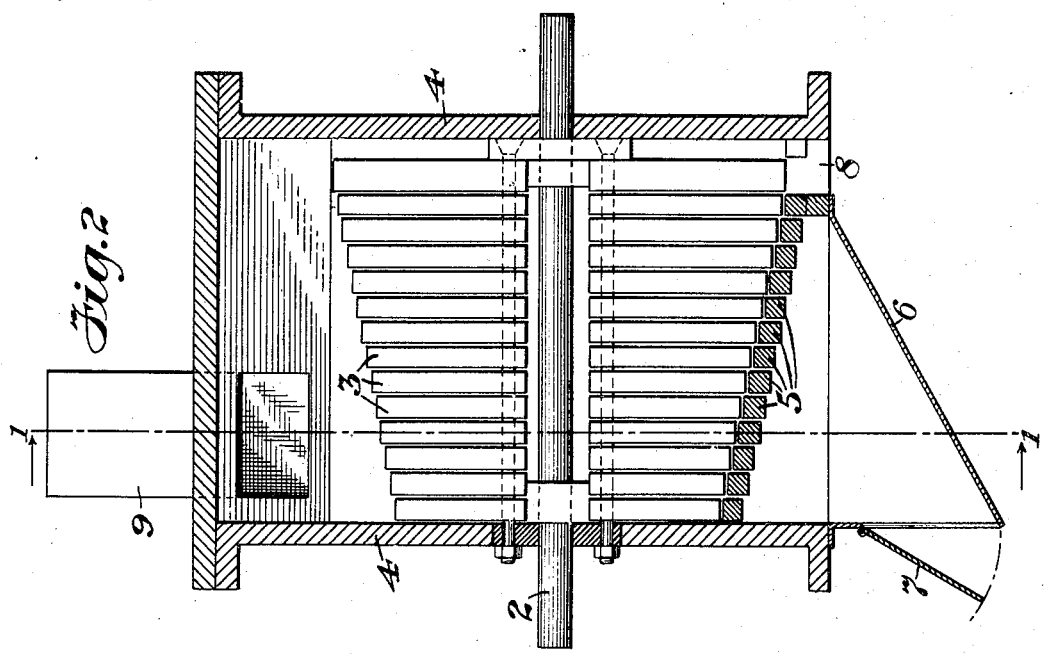
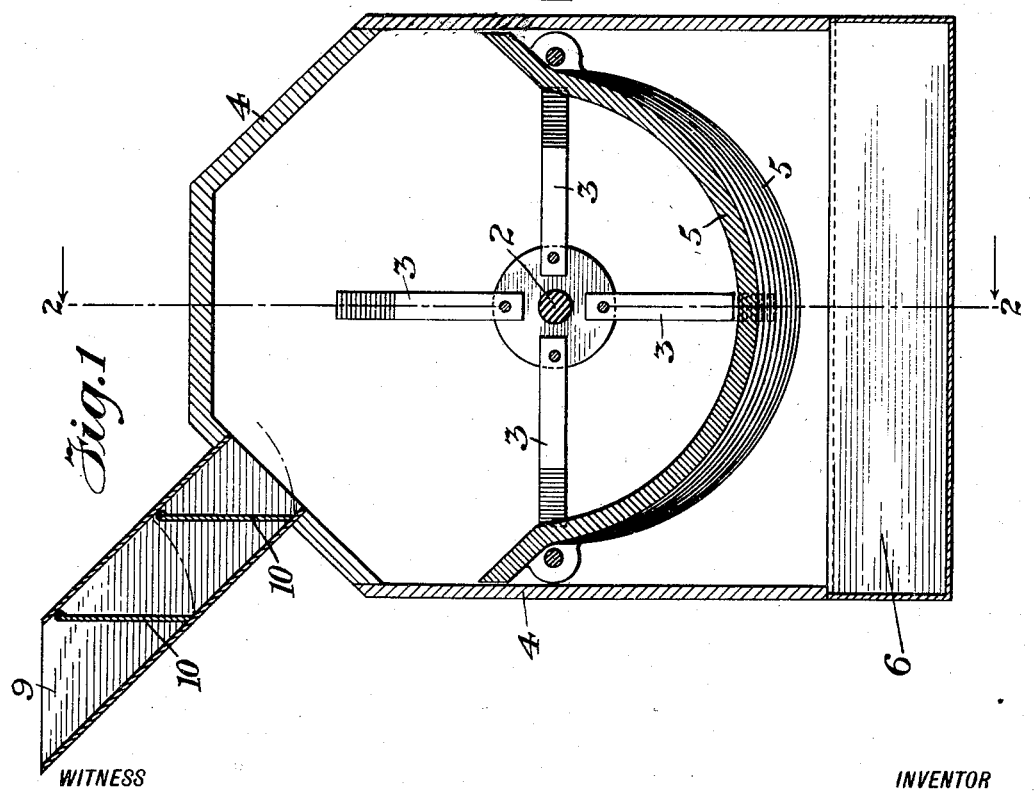
WITNESS
Chas. J. Clagett
INVENTOR
Emanuel Kardos
BY
Chas. F. Dane
HIS ATTORNEY

UNITED STATES PATENT OFFICE.

EMANUEL KARDOS, OF CHROME, NEW JERSEY, ASSIGNOR TO TH. GOLDSCHMIDT AKTIEN-GESELLSCHAFT, OF ESSEN-ON-THE-RUHR, GERMANY, A CORPORATION OF GERMANY.

APPARATUS FOR SEPARATING MATERIALS.

1,250,590.   Specification of Letters Patent.   Patented Dec. 18, 1917.

Application filed December 22, 1915. Serial No. 68,143.

*To all whom it may concern:*

Be it known that I, EMANUEL KARDOS, a subject of the Emperor of Austria-Hungary, and resident of Chrome, in the county of Middlesex and State of New Jersey, have invented certain new and useful Apparatus for Separating Materials, of which the following is a specification.

The present invention relates to a method of and apparatus for separating materials.

The invention is based on the principle that some materials, for instance, enamel, glass, porcelain, silica and other fragile, breakable or brittle materials, and certain ores, crystals, and the like, completely change their condition when submitted to mechanical influence, being thereby disintegrated or pulverized, whereas other materials, such, for instance, as metals, alloys, and certain ores and the like, are tenacious and able to resist mechanical influence.

In many cases both kinds of materials are present together, as, for instance, in enamel-metal sheets, hollow metal ware, and similar articles covered with enamel, or in certain ores, especially lead, tin and zinc ores in which metallic parts are intermixed with crystals or gangue.

The object of the present invention is to provide a process and apparatus for separating such materials.

According to this invention, the materials are submitted to a continuous hammering action. The brittle or fragile portions are thereby thoroughly disintegrated, whereas the less fragile, tough, tenacious or mechanically resistant portions are not disintegrated but are beaten together.

In this way two distinctive products are obtained which can easily be separated.

The invention is particularly suitable for removing silica coatings, such as enamel and the like, from metals. It is also suitable for separating gangue or crystals from metallic constituents in certain ores, such as lead, zinc and tin ores and the like.

In carrying out my invention, the material to be separated is struck by a number of hammers moving very rapidly. By this action the fragile or brittle material is broken off from its base and the mechanically more resistant or tenacious material is beaten together. The hammers are preferably mounted on a rotatable shaft, in such a manner that they assist at the same time in conveying the material which has not been disintegrated from one end of the shaft to the other.

Owing to the continuous action of the hammers, the brittle material is not only broken away from the non-brittle or tenacious material but is also thoroughly disintegrated.

An example of a suitable apparatus for carrying out my invention is illustrated in the accompanying drawings, in which—

Figure 1 is a vertical, transverse section of such an apparatus, the section being taken on line 1—1 of Fig. 2.

Fig. 2 is a central, vertical, longitudinal section of the same, the section being taken on line 2—2 of Fig. 1.

Similar reference characters indicate like parts on both figures of the drawings.

The apparatus illustrated comprises a rotatable shaft 2, provided with pivotally mounted hammers 3. This shaft extends through and is mounted in the end walls of a casing 4. At the bottom of this casing there is arranged a grate 5, preferably formed of bars of steel or other suitable material.

The bottom 6 of the casing under the grate is preferably sloping to form a discharge hopper, and at a convenient point there is provided a door 7 for removing the disintegrated material, while above the grating at its discharge end an opening 8 is provided for the delivery of the material which has not been disintegrated, which opening is so arranged that the material has to traverse the whole apparatus before it is discharged.

The casing is also provided with a feeding hopper 9. This hopper has means for preventing the material from being thrown out by the centrifugal action of the hammers, which means preferably consists of a double trap door 10—10 formed by two pivotally suspended plates which are arranged in such a way that one of the plates is always closed while the material is being charged.

The grate 5 in the construction shown slants downwardly from the receiving end of the apparatus toward the discharging point 8, while the shaft 2 carrying the hammers has its axis horizontal, and in this case the hammers are of different lengths, increasing gradually in length from the receiving to the discharging end of the grate so as to taper conically from one end of the set toward the other in order to coöperate with the grate. The shaft may, however, have its axis parallel with said grate, in which case the hammers will all be of the same length. In either case, however, the material under treatment will be caused, under the continuous action of the hammers, to have a continuous feeding movement from the receiving end of the grate toward the discharging end thereof.

The material which has not been disintegrated is discharged through the opening 8 and is thus separated from the brittle, broken off portion, which latter falls through the grate into the discharge hopper 6 of the casing from which it is removed through the door 7.

The spacing of the grate bars is such that a sufficient width of aperture is provided for allowing the disintegrated material to fall through. Means may be provided for enlarging or reducing the width of these apertures so as to obtain various grades of fineness of the disintegrated material.

What I claim is:—

1. An apparatus for separating materials containing both brittle and tenacious constituents comprising a casing having receiving and discharge openings, an inclined grate arranged in said casing and comprising separated grate bars arranged in declining stepped relation toward the discharge opening, and a plurality of rotary hammers located over said bars and coöperating therewith.

2. An apparatus for separating materials containing both brittle and tenacious constituents comprising a casing having inlet and discharge openings, a grate inclining downwardly toward the discharge opening and including a plurality of spaced arcuate grate bars and a plurality of hammers operating above and coöperating with the grate bars and movable in planes parallel to the bars.

3. An apparatus for separating materials containing both brittle and tenacious constituents comprising a casing having inlet and discharge openings, an inclined grate comprising a plurality of spaced arcuate bars arranged in stepped relation, a rotary shaft arranged coaxially with the bars, and beaters carried by the shaft and increasing in length as the grate declines.

Signed at New York, in the county of New York and State of New York, this 9th day of December, A. D. 1915.

EMANUEL KARDOS.

Witnesses:
JOHN C. McEACHEN,
C. J. BUTLER.